United States Patent [19]

Adam et al.

[11] Patent Number: 5,762,653
[45] Date of Patent: Jun. 9, 1998

[54] DYE MIXTURES, PROCESSES FOR THEIR PREPARATION AND THEIR USE

[75] Inventors: Jean-Marie Adam, Rosenau; Jean-Pierre Bacher, Buschwiller, both of France

[73] Assignee: Ciba Specialty Chemicals Corporation, Tarrytown, N.Y.

[21] Appl. No.: 811,449

[22] Filed: Mar. 3, 1997

[30] Foreign Application Priority Data

Mar. 4, 1996 [CH] Switzerland ............... 00561/96

[51] Int. Cl.$^6$ ............................................... C09B 67/22
[52] U.S. Cl. .................. 8/638; 8/641; 8/643; 8/917; 8/924; 534/797; 534/803; 534/DIG. 1
[58] Field of Search ................... 534/638, 641, 534/643, 917, 924

[56] References Cited

U.S. PATENT DOCUMENTS

| | | | |
|---|---|---|---|
| 5,232,462 | 8/1993 | Tzikas | 8/549 |
| 5,324,330 | 6/1994 | Schaulin et al. | 8/638 X |
| 5,451,665 | 9/1995 | Tzikas | 534/618 |
| 5,554,734 | 9/1996 | Lauk | 534/691 |
| 5,612,463 | 3/1997 | Tzikas | 534/634 |
| 5,631,352 | 5/1997 | Lauk | 534/797 |
| 5,653,773 | 8/1997 | Reddig et al. | 8/638 X |

FOREIGN PATENT DOCUMENTS

| | | |
|---|---|---|
| 0478503 | 4/1992 | European Pat. Off. |
| 2166147 | 4/1986 | United Kingdom. |
| 0290384 | 12/1992 | United Kingdom. |
| 0693538 | 1/1996 | United Kingdom. |

OTHER PUBLICATIONS

Dyes & Pigments, vol. 28, No. 3, pp. 171–192, 1985.
JSDC, vol. 111, Jan./Feb. 1995, pp. 12–18.
Derwent Abst. 121:232936, 1994.
Derwent Abstract 88-316608[45] of EP290384, 1992.

*Primary Examiner*—Fiona T. Powers
*Attorney, Agent, or Firm*—David R. Crichton

[57] ABSTRACT

Dye mixtures which comprise at least one dye of the formula

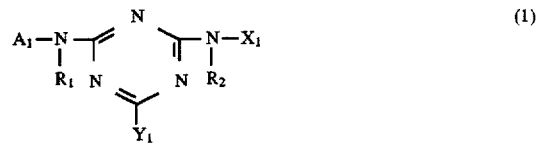
(1)

and at least one dye of the formula

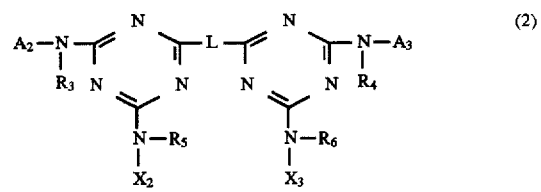
(2)

in which $Y_1$ is a radical of the formula

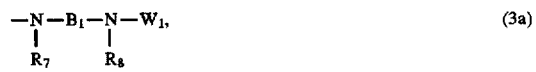
(3a)

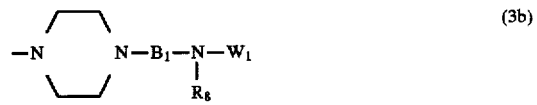

(3b)

or

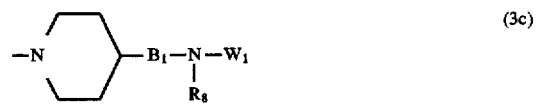
(3c)

and $R_1$, $R_2$, $R_3$, $R_4$, $R_5$, $R_6$, $R_7$, $R_8$, $X_1$, $X_2$, $X_3$, L, $W_1$, $B_1$, $A_1$, and $A_3$ are as defined in claim 1.

The dye mixtures according to the invention are particularly suitable for dyeing or printing natural or synthetic polyamide fibre materials.

16 Claims, No Drawings

DYE MIXTURES, PROCESSES FOR THEIR PREPARATION AND THEIR USE

The present invention relates to novel dye mixtures, processes for their preparation and the use of these dye mixtures for dyeing and printing fibre materials, in particular textile fibre materials.

The present invention relates to dye mixtures which comprise at least one dye of the formula

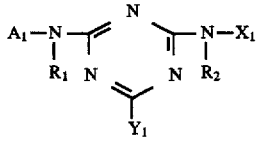

and at least one dye of the formula

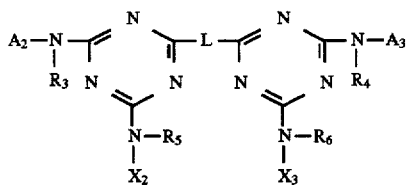

in which $R_1$, $R_2$, $R_3$, $R_4$, $R_5$ and $R_6$ independently of one another are hydrogen or substituted or unsubstituted $C_1$–$C_4$alkyl, $X_1$, $X_2$ and $X_3$ independently of one another are substituted or unsubstituted $C_1$–$C_8$alkyl, $C_5$–$C_7$cycloalkyl, phenyl or naphthyl which are unsubstituted or substituted by $C_1$–$C_4$alkyl, $C_1$–$C_4$alkoxy, $C_2$–$C_4$alkanoylamino, amino, hydroxyl, ureido, halogen, carboxyl or sulfo, or the radical of the formula —$N(R_2)$—$X_1$, —$N(R_5)$—$X_2$ or —$N(R_6)$—$X_3$ is a ring which may contain further heteroatoms, is an organic bridge member, $Y_1$ is a radical of the formula

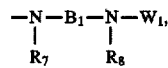 (3a)

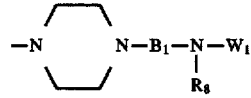 (3b)

or

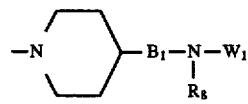 (3c)

in which $B_1$ is a colourless organic bridge member, $R_7$ and $R_8$ independently of one another are hydrogen or substituted or unsubstituted $C_1$–$C_4$alkyl, $W_1$ is hydrogen, substituted or unsubstituted $C_1$–$C_8$alkyl, $C_5$–$C_7$cycloalkyl, phenyl or naphthyl, or a radical of the formula —CO—R, in which R is substituted or unsubstituted $C_1$–$C_8$alkyl, C5–$C_7$cycloalkyl, phenyl or naphthyl, and $A_1$, $A_2$ and A3 independently of one another are radicals of a monoazo, polyazo, metal complex azo, anthraquinone, formazan, phthalocyanine or dioxazine dye.

$C_1$–$C_4$alkyl $R_1$, $R_2$, $R_3$, $R_4$, $R_6$, $R_7$ and $R_8$ independently of one another are, for example methyl, ethyl, propyl, isopropyl, butyl, sec-butyl, tert-butyl or isobutyl. The alkyl radicals mentioned can be unsubstituted or substituted, for example by hydroxyl, sulfo, sulfato, cyano or carboxyl. Preferred alkyl radicals are the corresponding unsubstituted radicals.

$C_1$–$C_8$alkyl $X_1$, $X_2$, $X_3$, $W_1$ and R independently of one another are preferably $C_1$–$C_4$alkly radicals, for example methyl, ethyl, propyl, isopropyl, butyl, sec-butyl, tert-butyl or isobutyl. The alkyl radicals mentioned can be unsubstituted or substituted, for example by hydroxyl, sulfo, sulfato, cyano or carboxyl. The unsubstituted radicals are preferred here.

A ring which may contain further hetero atoms for the radical of the formula —$N(R_2)$—$X_1$, —$N(R_5)$—$X_2$ or —$N(R6)$—$X_3$ is, for example, morpholino.

$C_5$–$C_7$cycloalkyl $X_1$, $X_2$, $X_3$, $W_1$ and R is, in particular, the cyclohexyl radical. The cycloalkyl radicals mentioned can be unsubstituted or substituted, for example by $C_1$–$C_4$alkyl, in particular by methyl.

Phenyl or naphthyl $X_1$, $X_2$ and $X_3$ are, in addition to the corresponding unsubstituted radicals, the radicals substituted, for example, by $C_1$–$C_4$alkyl, $C_1$–$C_4$alkoxy, $C_2$–$C_4$alkanoylamino, amino, hydroxyl, ureido, halogen, carboxyl or sulfo.

Phenyl or naphthyl $W_1$ and R are, in addition to the corresponding unsubstituted radicals, the radicals which are substituted, for example by $C_1$–$C_4$alkyl, $C_1$–$C_4$alkoxy, $C_2$–$C_4$alkanoylamino, amino, hydroxyl, ureido, halogen, carboxyl or sulfo.

A colourless organic bridge member $B_1$ is, for example, substituted or unsubstituted $C_1$–$C_{12}$alkylene, which can be interrupted by 1, 2 or 3 members from the group consisting of —NH—, —$N(CH_3)$— or —O—, or substituted or unsubstituted $C_5$–$C_7$cycloalkylene, phenylene or naphthylene. $C_5$–$C_7$cycloalkylene here is, in particular, cyclohexylene, which can be unsubstituted or substituted, for example by $C_1$–$C_4$alkyl, in particular by methyl. Substituents here of the phenylene and napthylene radicals mentioned are, for example, $C_1$–$C_4$alkyl, $C_1$–$C_4$alkoxy, $C_2$–$C_4$alkanoylamino, amino, hydroxyl, ureido, halogen, carboxyl or sulfo, in particular $C_1$–$C_4$alkyl, $C_1$–$C_4$alkoxy, halogen or sulfo. Substituents of the $C_1$–$C_{12}$alkylene radicals mentioned are, for example hydroxyl, sulfo, sulfato, cyano or carboxyl. The $C_1$–$C_{12}$-alkylene radicals are preferably unsubstituted.

$R_1$, $R_2$, $R_3$, $R_4$, $R_5$ and R6 are preferably independently of one another hydrogen or $C_1$–$C_4$alkyl. $R_1$, $R_3$ and $R_4$ are particularly preferably hydrogen, methyl or ethyl, in particular hydrogen. $R_2$, $R_5$ and $R_6$ are particularly preferably $C_1$–$C_4$alkyl, in particular methyl or ethyl, and preferably ethyl.

$X_1$, $X_2$ and $X_3$ are preferably independently of one another $C_1$–$C_8$alkyl, $C_5$–$C_7$cycloalkyl which is unsubstituted or substituted by $C_1$–$C_4$alkyl, or phenyl or naphthyl which are unsubstituted or substituted by $C_1$–$C_4$alkyl, $C_1$–$C_4$alkoxy, $C_2$–$C_4$alkanoylamino, ureido, halogen, carboxyl or sulfo. The phenyl radical, which can be substituted as defined above, is particularly preferred here. $X_1$, $X_2$ and $X_3$ are especially preferably phenyl which is unsubstituted or substituted by $C_1$–$C_4$alkyl, $C_1$–$C_4$alkoxy, halogen or sulfo, preferably unsubstituted phenyl. $R_2$, $R_5$ and $R_6$ are particularly preferably $C_1$–$C_4$alkyl, in particular methyl or ethyl and preferably ethyl.

$B_1$ is preferably a $C_1$–$C_{12}$alkylene radical, in particular a $C_1$–$C_{10}$alkylene radical, which can be interrupted by 1, 2 or 3 members from the group consisting of —NH—, —$N(CH_3)$— and, in particular, —O— and is unsubstituted or substituted by hydroxyl, sulfo , sulfato , cyano or carboxyl. The corresponding unsubstituted alkylene radicals are of particular interest here. $B_1$ is particularly preferably a $C_1$–$C_{10}$alkylene radical, in particular a $C_1$–$C_6$alkylene radical, and preferably a $C_1$–$C_4$alkylene radical. Particularly interesting radicals $B_1$ are those of the formulae —$CH_2$—, —$CH_2CH_2$— and —$CH_2CH_2CH_2$—.

$R_7$ is preferably hydrogen or $C_1$–$C_4$alkyl, in particular hydrogen.

$R_8$ is preferably hydrogen or $C_1$–$C_8$alkyl which is unsubstituted or substituted by hydroxyl, sulfo, sulfato, cyano or carboxyl, preferably hydrogen or $C_1$–$C_4$alkyl, and in particular hydrogen.

R is preferably phenyl which is unsubstituted or substituted by $C_1$–$C_4$alkyl, $C_1$–$C_4$alkoxy, halogen, carboxyl or sulfo, or, in particular, $C_1$–$C_8$alkyl. R is particularly preferably $C_1$–$C_4$alkyl, in particular methyl or ethyl, and preferably methyl.

$W_1$ is preferably hydrogen or a radical of the formula —CO—R, in which R is as defined and preferred above. In particular, R here is $C_1$–$C_8$alkyl or phenyl which is unsubstituted or substituted by $C_1$–$C_4$alkyl, $C_1$–$C_4$alkoxy, halogen, carboxyl or sulfo, preferably $C_1$–$C_8$alkyl. $W_1$ is particularly preferably hydrogen.

The radical Y, is preferably a radical of the formula (3a) or (3b), in particular a radical of the formula (3a).

Organic bridge members L are, for example, radicals of the formula

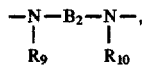 (4a)

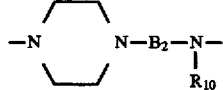 (4b)

or

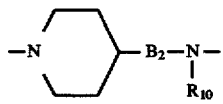 (4c)

in which $B_2$ is as defined and preferred above for $B_1$, $R_9$ is as defined and preferred above for $R_7$ and $R_{10}$ is as defined and preferred above for $R_8$.
Bridge members L of the formula

are furthermore of interest.

Preferably, $R_9$ and $R_{10}$ independently of one another are hydrogen or $C_1$–$C_4$alkyl and $B_2$ is a $C_1$–$C_{10}$alkylene radical which can be interrupted by 1, 2 or 3 members from the group consisting of —NH—, —N($CH_3$)— and —O— and is unsubstituted or substituted by hydroxyl, sulfo, sulfato, cyano or carboxyl.

L are radicals preferably of the formulae (4a), (4b) and (4c), in particular radicals of the formulae (4a) and (4b), and preferably radicals of the formula (4a).

The radicals $A_1$, $A_2$ and $A_3$ can contain the substituents customary for organic dyes bonded to their basic structure.

Examples of substituents in the radicals $A_1$, $A_2$ and $A3$ are: alkyl groups having 1 to 4 carbon atoms, such as methyl, ethyl, propyl, isopropyl or butyl, it being possible for the alkyl radicals to be further substituted, for example by hydroxyl, sulfo or sulfato; alkoxy groups having 1 to 4 carbon atoms, such as methoxy, ethoxy, propoxy, isopropoxy or butoxy, it being possible for the alkyl radicals to be further substituted, for example by hydroxyl, sulfo or sulfato; phenyl which is unsubstituted or substituted by $C_1$–$C_4$alkyl, $C_1$–$C_4$alkoxy, halogen, carboxyl or sulfo; acylamino groups having 1 to 8 carbon atoms, in particular such alkanoylamino groups, for example acetylamino or propionylamino; benzoylamino which is unsubstituted or substituted in the phenyl ring by $C_1$–$C_4$alkyl, $C_1$–$C_4$alkoxy, halogen or sulfo; phenylamino which is unsubstituted or substituted in the phenyl ring by $C_1$–$C_4$alkyl, $C_1$–$C_4$alkoxy, halogen or sulfo; N,N-di-β-hydroxyethylamino; N,N-di-β-sulfatoethylamino; alkylsulfonyl having 1 to 4 carbon atoms, such as methylsulfonyl or ethylsulfonyl; trifluoromethyl; nitro; amino; cyano; halogen, such as fluorine, chlorine or bromine; carbamoyl; sulfamoyl; N-mono- or N,N-dialkylsulfamoyl having in each case 1 to 4 carbon atoms; N-phenylsulfamoyl which is unsubstituted or substituted by $C_1$–$C_4$alkyl, $C_1$–$C_4$alkoxy, halogen, carboxyl or sulfo; ureido; hydroxyl; carboxyl; sulfomethyl or sulfo.

Radicals $A_1$, $A_2$ and $A_3$ of a monoazo dye are preferably radicals of the formula

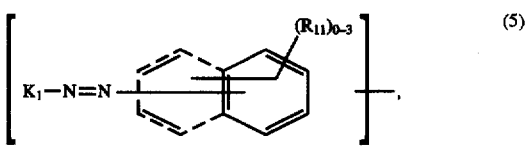 (5)

in which $(R_{11})_{0-3}$ is 0 to 3 identical or different substituents chosen from the group consisting of $C_1$–$C_4$alkyl, $C_1$–$C_4$alkoxy, $C_2$–$C_4$alkanoylamino, halogen, hydroxyl, cyano, carbamoyl, carboxyl, sulfo, amino and N-mono- or N,N-di-$C_1$–$C_4$alkylamino and $K_1$ is a radical of the benzene or naphthalene series or a heterocyclic radical.

$(R_{11})_{0-3}$ is preferably 0 to 3 identical or different substituents chosen from the group consisting of $C_1$–$C_4$alkyl, $C_1$–$C_4$alkoxy, halogen and sulfo. The radicals of the formula (5) particularly preferably contain only one substituent $R_{11}$, which is hydrogen or sulfo, in particular sulfo.

The radical $K_1$ is preferably a benzene, naphthalene, 6-hydroxypyrid-2-one, 1-phenyl-5-aminopyrazole, 1phenyl-5-aminopyrazole or 1-phenylpyrazol-5- one radical, and preferably a naphthalene, 1-phenyl-5-aminopyrazole or 1-phenylpyrazol-5-one radical, and preferably a naphthalene, 1-phenyl-5-aminopyrazole or 1-phenylpyrazol-5-one radical.

Examples of substituents of the radical $K_1$ are the following: $C_1$–$C_8$alkyl, in particular $C_1$–$C_4$alkyl, such as methyl, ethyl, propyl, isopropyl, butyl, isobutyl, sec-butyl or tert-butyl; $C_1$–$C_8$alkoxy, in particular $C_1$–$C_4$alkoxy, such as methoxy, ethoxy, propoxy, isopropoxy, butoxy, isobutoxy, sec-butoxy or tert-butoxy; $C_2$–$C_6$-alkanoylamino, in particular $C_2$–$C_4$-alkanoylamino, for example propionylamino or, in particular, acetylamino; halogen, for example fluorine or, in particular, chlorine; hydroxyl; cyano; carbamoyl; carboxyl; sulfo; phenyl; amino and N-mono- or N,N-di-$C_1$–$C_4$alkylamino. In this case, the phenyl radicals mentioned can be unsubstituted or substituted, for example by $C_1$–$C_4$alkyl, $C_1$–$C_4$alkoxy, $C_2$–$C_4$-alkanoylamino, ureido, halogen, carboxyl or sulfo.

Particularly preferably, $K_1$ is a radical of the formula

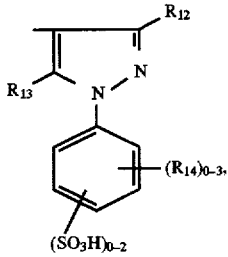

in which $R_{12}$ is methyl or carboxyl,
$R_{13}$ is amino or hydroxyl and
$(R_{14})_{0-3}$ is 0 to 3 identical or different substituents chosen from the group consisting of
$C_1$–$C_4$alkyl, $C_1$–$C_4$alkoxy, $C_2$–$C_4$alkanoylamino, ureido, halogen, carboxyl and sulfo, or
$K_1$ is a radical of the formula

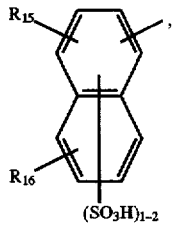

in which $R_{15}$ is hydrogen, amino or N-mono- or N,N-di-$C_1$–$C_4$alkylamino and $R_{16}$ is hydrogen or hydroxyl.

$R_{12}$ is preferably methyl.

$(R_{14})_{0-3}$ is preferably 0 to 3 identical or different substituents chosen from the group consisting of $C_1$–$C_4$alkyl, $C_1$–$C_4$alkoxy, halogen and sulfo.

$R_{15}$ is preferably amino or N-mono- or N,N-di-$C_1$–$C_4$alkylamino, in particular amino.

$R_{16}$ is preferably hydrogen.

The radicals of the formula (7) preferably contain only one sulfo group.

Preferred radicals $K_1$ of the formula (7) are those of the formula

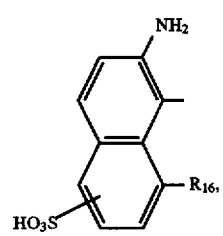

in which $R_{16}$ is hydrogen or hydroxyl, in particular hydrogen.

The radical of the formula (5) is preferably a radical of the formula

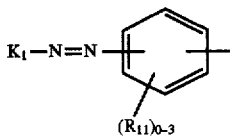

in which $K_1$ and $(R_{11})_{0-3}$ are as defined and preferred above.

Radicals $A_1$, $A_2$ and $A_3$ of a polyazo dye are, in particular, radicals of a disazo dye, preferably radicals of the formula

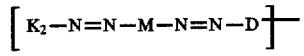

in which D is a radical of the benzene or naphthalene series,
M is the radical of a central component of the benzene or naphthalene series and
$K_2$ is a radical of the benzene or naphthalene series or a heterocyclic radical.

The radical $K_2$ here is as defined and preferred above for $K_1$.

Examples of substituents of the radicals D and M are the following: $C_1$–$C_8$alkyl, in particular $C_1$–$C_4$alkyl, such as methyl, ethyl, propyl, isopropyl, butyl, isobutyl, sec-butyl or tert-butyl; $C_1$–$C_8$alkoxy, in particular $C_1$–$C_4$alkoxy, such as methoxy, ethoxy, propoxy, isopropoxy, butoxy, isobutoxy, sec-butoxy or tert-butoxy; C2–C6alkanoylamino, in particular $C_2$–$C_4$alkanoylamino, for example propionylamino or, in particular, acetylamino; halogen, for example fluorine or, in particular, chlorine; hydroxyl; cyano; carbamoyl; carboxyl; sulfo; phenyl; amino and N-mono- or N,N-di-$C_1$–$C_4$alkylamino. In this case, the phenyl radicals mentioned can be unsubstituted or substituted, for example by $C_1$–$C_4$alkyl, $C_1$–$C_4$alkoxy, $C_2$–$C_4$alkanoylamino, ureido, halogen, carboxyl or sulfo.

Preferred substituents of the radicals D and M are $C_1$–$C_4$alkyl, $C_1$–$C_4$alkoxy, $C_2$–$C_4$alkanoylamino, halogen, hydroxyl, cyano, carbamoyl, carboxyl, sulfo, amino or N-mono- or N,N-di-$C_1$–$C_4$alkylamino. Particularly preferred substituents of the radicals D and M are $C_1$–$C_4$alkyl, $C_1$–$C_4$alkoxy, $C_2$–$C_4$alkanoylamino, halogen, hydroxyl, sulfo, amino or N-mono- or N,N-di-$C_1$–$C_4$alkylamino.

Particularly preferred radicals $A_1$, $A_2$ and $A_3$ of a disazo dye are radicals of the formula

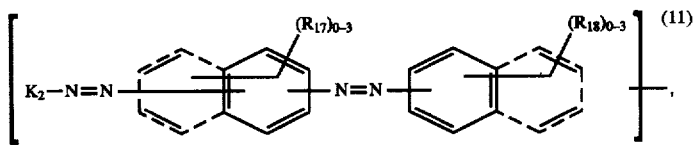

in which $K_2$ is as defined and preferred above and $(R_{17})_{0-3}$ and $(R_{18})_{0-3}$ independently of one another are 0 to 3 identical or different substituents chosen from the group consisting of $C_1$–$C_4$alkyl, $C_1$–$C_4$alkoxy, $C_2$–$C_4$alkanoylamino, halogen, hydroxyl, cyano, carbamoyl, carboxyl, sulfo, amino and N-mono- or N,N-di-$C_1$–$C_4$alkylamino. $(R_{17})_{0-3}$ and $(R_{18})_{0-3}$ preferably independently of one another are 0 to 3 identical or different substituents chosen from the group consisting of $C_1$–$C_4$alkyl, Cl-$C_4$alkoxy, $C_2$–$C_4$alkanoylamino, halogen, hydroxyl, sulfo, amino and N-mono- or N,N-di-$C_1$–$C_4$alkylamino. $(R_{17})_{0-3}$ and $(R_{18})_{0-3}$ especially preferably independently of one another are 0 to 3 identical or different substituents chosen from the group consisting of $C_1$–$C_4$alkyl, $C_1$–$C_4$alkoxy, $C_2$–$C_4$alkanoyl-amino, halogen, hydroxyl, sulfo and amino.

Especially preferred radicals $A_1$, $A_2$ and $A_3$ of a disazo dye are radicals of the formula

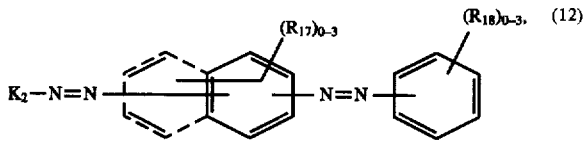   (12)

in which $K_2$, $(R_{17})_{0-3}$ and $(R_{18})_{0-3}$ are as defined and preferred above.

Radicals $A_1$, $A_2$ and $A_3$ of an anthraquinone dye are, in particular, radicals of the formula

   (13)

in which G is a phenylene radical which is unsubstituted or substituted by $C_1C_4$alkyl, $C_1$–$C_4$alkoxy, halogen, carboxyl or sulfo, or a cyclohexylene, phenylenemethylene or $C_2$–$C_6$alkylene radical.

G is preferably a phenylene radical which is unsubstituted or substituted by $C_1$–$C_4$alkyl, $C_1$–$C_4$alkoxy, halogen, carboxyl or sulfo, in particular by $C_1$–$C_4$alkyl or sulfo.

Particularly important radicals $A_1$, $A_2$ and A3 of an anthraquinone dye are those of the formula

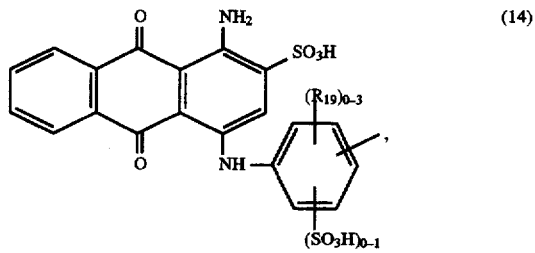   (14)

in which $(R_{19})_{0-3}$ is identical or different substituents chosen from the group consisting of $C_1$–$C_4$alkyl, $C_1$–$C_4$alkoxy, halogen, carboxyl and sulfo. $R_{19}$ here is particularly preferably $C_1$–$C_4$alkyl, in particular methyl. The radicals of the formula (14) preferably contain two sulfo groups.

The radicals $A_1$, $A_2$ and A3 are preferably radicals of a monoazo, disazo or anthraquinone dye, these radicals being as defined and preferred above.

$A_1$, $A_2$ and $A_3$ are preferably radicals of the formula (5), (10) or (13). $K_1$ and $K_2$ here are preferably radicals of the formula (6) or (7), in particular radicals of the formula (6) or (8). The radicals $R_1$, $R_2$, $R_3$, $R_4$, $R_5$, $R_6$, $X_1$, $X_2$, $X_3$, $Y_1$ and L here are as defined and preferred above.

$A_1$, $A_2$ and $A_3$ are particularly preferably radicals of the formula (5), (1 1) or (13). $K_1$ and $K_2$ here are preferably radicals of the formula (6) or (7), in particular radicals of the formula (6) or (8). The radicals $R_1$, $R_2$, $R_3$, $R_4$, $R_5$, $R_6$, $X_1$, $X_2$, $X_3$, $Y_1$ and L here are as defined and preferred above.

$A_1$, $A_2$ and $A_3$ are especially preferably radicals of the formula (9), (12) or (14). $K_1$ and $K_2$ here are preferably radicals of the formula (6) or (7), in particular radicals of the formula (6) or (8). The radicals $R_1$, $R_2$, $R_3$, $R_4$, $R_5$, $R_6$, $X_1$, $X_2$, $X_3$, $Y_1$ and L here are as defined and preferred above.

Preferred dye mixtures are those in which $R_1$, $R_2$, $R_3$, $R_4$, $R_5$, $R_6$, $R_7$ and $R_8$ are hydrogen or $C_1$–$C_4$alkyl, $X_1$, $X_2$ and $X_3$ are phenyl which is unsubstituted or substituted by $C_1$–$C_4$alkyl, $C_1$–$C_4$alkoxy, $C_2$–$C_4$alkanoylamino, ureido, halogen, carboxyl or sulfo, $B_1$ is a $C_1$–$C_{10}$alkylene radical, which can be interrupted by 1, 2 or 3 members from the group consisting of —NH—, —N(CH$_3$)— and —O— and is unsubstituted or substituted by hydroxyl, sulfo, sulfato, cyano or carboxyl, $W_1$ is hydrogen or a radical of the formula —CO—R, in which R is phenyl which is unsubstituted or substituted by $C_1$–$C_4$alkyl, $C_1$–$C_4$alkoxy, halogen, carboxyl or sulfo, or, in particular, $C_1$–$C_8$alkyl, and L is a radical of the formula (4a), (4b) or (4c), in which $R_9$ and $R_{10}$ are hydrogen or $C_1$–$C_4$alkyl and $B_2$ is as defined above for $B_1$. The radicals $A_1$, $A_2$ and $A_3$ here are as defined and preferred above. $R_2$, $R_5$ and $R_6$ here are preferably $C_1$–$C_4$alkyl.

Particularly preferred dye mixtures are those in which $Y_1$ is a radical of the formula

   (3a)

L is a radical of the formula

   (4a)

or $Y_1$ is a radical of the formula

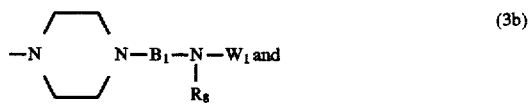   (3b)

L is a radical of the formula

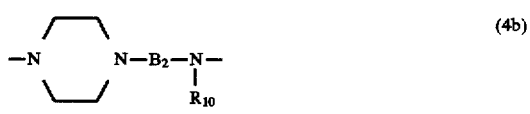   (4b)

or $Y_1$ is a radical of the formula

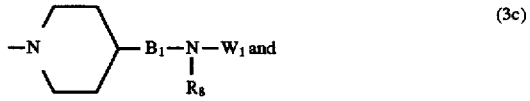   (3c)

L is a radical of the formula

   (4c)

in which $B_1$ and $B_2$ have identical meanings, $R_7$ and $R_9$ have identical meanings and $R_8$ and $R_{10}$ have identical meanings.

Preferably, the radicals $A_1$, $A_2$ and $A_3$; the radicals $X_1$, $X_2$ and $X_3$; the radicals $R_1$, $R_3$ and $R_4$; and the radicals $R_2$, $R_5$ and $R_6$ here in each case have identical meanings.

Preferably, $B_1$ and $B_2$ here are a $C_1$–$C_{10}$ alkylene radical which can be interrupted by 1, 2 or 3 members from the group consisting of —NH—, —N(CH$_3$)— and —O— and is unsubstituted or substituted by hydroxyl, sulfo, sulfato, cyano or carboxyl, $R_7$ and $R_9$ are hydrogen or $C_1$–$C_4$ alkyl, $R_8$ and $R_{10}$ are hydrogen or $C_1$–$C_4$ alkyl and $W_1$ is hydrogen or a radical of the formula —CO—R, in which R is phenyl which is unsubstituted or substituted by $C_1$–$C_4$ alkyl, $C_1$–$C_4$ alkoxy, halogen, carboxyl or sulfo, or, in particular, $C_1$–$C_8$ alkyl.

The dyes of the formula (1) can be obtained, for example, by reacting cyanuric halide, in particular cyanuric fluoride or, preferably, cyanuric chloride, with a compound of the formula

$A_1$—NHR$_1$ (15)

a compound of the formula

$X_1$—NHR$_2$ (16)

and a compound of the formula

$Y_1$—H (17)

and if appropriate subsequently carrying out a conversion reaction, in which $A_1$, $X_1$, $Y_1$ $R_1$ and $R_2$ are as defined under formula (1).

Preferably, cyanuric halide is first reacted with approximately stoichiometric amounts of a compound of the formula (15) at a temperature of −5 to 20° C., preferably 0° to 5° C., the pH being kept neutral to acid, preferably at 2 to 7, in particular 2 to 4, by addition of suitable bases, for example alkali metal bases, such as lithium hydroxide or carbonate, sodium hydroxide or carbonate or potassium hydroxide or carbonate. Approximately stoichiometric amounts of a compound of the formula (16) are advantageously added to the resulting reaction mixture, and this compound is reacted with the triazine derivative at slightly elevated temperature, preferably at 10° to 60° C., in particular 15° to 30° C., and at a neutral to slightly acid pH, which is preferably 6 to 7.

Another possibility comprises first reacting cyanuric halide with an intermediate of the compound of the formula (15), for example a diazo component in the case of azo dye radicals, and then reacting the product to give the corresponding dye radical $A_1$, for example by diazotization and coupling. This reaction to give a dye radical can be carried out, for example, preferably directly after the reaction of cyanuric halide with the intermediate, or else during the subsequent course of the synthesis of the dye of the formula (1).

The triazinyl compounds obtainable by the processes described above contain a further halogen atom, which can be converted into a group $Y_1$ by reaction with a compound of the formula (17) at elevated temperature, preferably 20° to 70° C., and at a neutral to slightly alkaline pH, which is, for example, 7 to 9, depending on the compound of the formula (17) employed. An excess of the compound of the formula (17) is advantageously employed.

A conversion reaction is, in particular, an acylation reaction, in which a radical $W_1$ of the formula —CO—R is introduced.

The procedure here is as described above, using a compound of the formula (17) in which $W_1$ is hydrogen. The resulting reaction product is then reacted with a compound of the formula

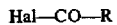
Hal—CO—R (18)

in which Hal is halogen, in particular bromine or chlorine, and R is as defined above.

Acetic anhydride is preferably used for the introduction of a radical of the formula —CO—R is which R is methyl.

The reaction with compounds of the formula (18) defined above can generally be carried out in dipolar aprotic solvents, for example dimethylformamide, dimethyl sulfoxide or N-methyl- pyrrolidone, in the presence of a base, for example an alkali metal carbonate or alkali metal hydroxide, for example sodium carbonate, potassium carbonate or sodium hydroxide, at a temperature of, for example, 30° to 80° C.

The reaction with acetic anhydride is as a rule carried out in aqueous medium in the presence of a base, for example an alkali metal carbonate or alkali metal hydroxide, for example sodium carbonate, potassium carbonate or sodium hydroxide, at a temperature of, for example, 20° to 60° C., in particular 30° to 50° C., and a pH of, for example, 4 to 7, in particular 5 to 6.

Dyes of the formula (2) can be obtained, for example, by reacting a compound of the formula

H—L—H (19)

in any sequence with a compound of the formula

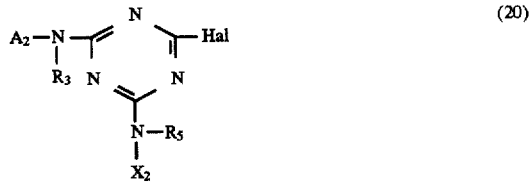
(20)

and a compound of the formula

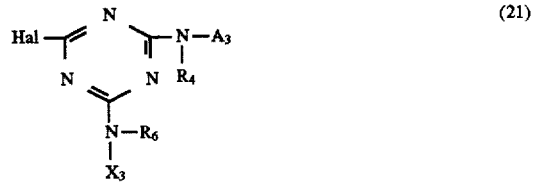
(21)

in which $R_3$, $R_4$, $R_5$, $R_6$, $A_2$, $A_3$, $X_2$, $X_3$ and L are as defined under formula (2) and Hal is halogen, in particular fluorine or preferably chlorine.

The reaction of the compound of the formula (19) with the compounds of the formulae (20) and (21) is preferably carried out at slightly elevated temperature, advantageously, for example, at 30° to 80° C., and at a pH of, for example, 7 to 10, approximately stoichiometric amounts of the compounds of the formulae (20) and (21) advantageously being employed. If the compounds of the formulae (20) and (21) are identical compounds, about 2 molar equivalents of the compound of the formula (20) are advantageously employed and this is reacted with about 1 molar equivalent of the compound of the formula (19).

Dye mixtures which comprise a dye of the formula (1) together with a dye of the formula (2) can be obtained, for example, by reacting a compound of the formula (20) with a compound of the formula (19). The compounds of the formulae (20) and (19) are employed here in a molar ratio which is greater than 1:1 and less than 2:1. The compounds of the formulae (20) and (19) are preferably employed here in a molar ratio of 9:8 to 15:8, in particular in a molar ratio of 10:8 to 14:8. The introduction of a radical $W_1$ of the formula —CO—R into the dye of the formula (1) of the dye mixture can then be carried out as stated above.

The compounds employed in the above processes are known or can be obtained analogously to known compounds.

The dye mixtures of the dyes of the formuae (1) and (2) can also be prepared, for example, by mixing the individual dyes. This mixing process is carried out, for example, in suitable mills, for example bead and pinned disc mills, as well as in kneaders or mixers.

The dye mixtures can furthermore be prepared, for example, by spray drying the aqueous dye mixtures.

The dye mixtures preferably comprise 5 to 95% by weight, in particular 10 to 90% by weight, and preferably 20 to 80% by weight of a dye of the formula (1), based on the total amount of the dyes of the formulae (1) and (2). The dye mixtures particularly preferably comprise 30 to 70% by weight, in particular 40 to 60% by weight of a dye of the formula (1), based on the total amount of the dyes of the formulae (1) and (2).

The dyes of the formulae (1) and (2) are present either in the form of their free acid or, preferably, as salts thereof.

Salts are, for example, the alkali metal, alkaline earth metal or ammonium salts or the salts of an organic amine. Examples are the sodium, lithum, potassium or ammonium salts or the salt of mono-, di- or triethanolamine.

The term sulfo generally includes the free acid form (—SO$_3$H) and also the salt form.

The dyes of the formulae (1) and (2) are anionic acid dyes. In the dyes of the formulae (1) and (2), the number of anionic groups, in particular the number of sulfo groups, is greater than or equal to the number of cationic groups. Preferably, the number of anionic groups is greater than the number of cationic groups. Cationic groups are to be understood as meaning those which carry a cationic charge under customary dyeing conditions. Examples are aliphatically bonded amino radicals. The nitrogen atoms present in the triazine ring and those bonded to the triazine radical carry no cationic charge. The total number of sulfo and sulfato groups of the dyes of the formula (1) is preferably greater than one. The total number of sulfo and sulfato groups of the dyes of the formula (1) is preferably two to four, in particular two or three, and preferably two. The total number of sulfo and sulfato groups of the dyes of the formula (2) is preferably greater than two. Preferably, the total number of sulfo and sulfato groups of the dyes of the formula (2) is three to eight, in particular four to eight, and preferably four.

The dye mixtures according to the invention are suitable, by methods known per se, for dyeing and printing, in particular fibre materials containing nitrogen or containing hydroxyl groups, for example textile fibre materials of cellulose, silk and, in particular, wool and synthetic polyamides. Dyeing or printing of natural or synthetic polyamide fibre materials is preferred. The dye mixtures according to the invention can be used for dyeing and printing in the generally customary form, which may be worked up beforehand, if appropriate. Level dyeings with good all-round fastnesses, in particular good fastness to rubbing, wet processing, wet rubbing and light, are obtained. The dye mixtures according to the invention are furthermore readily water-soluble and can easily be combined with other dyes. The abovementioned textile material can be in the most diverse forms of processing, for example as fibre, yarn, woven fabric or knitted fabrics.

The following examples serve to illustrate the invention. The temperatures are stated in degrees Celsius, parts are parts by weight and the percentage data are based on percentages by weight, unless noted otherwise. Parts by weight bear the same relation to parts by volume as the kilogramme to the liter.

PREPARATION EXAMPLE 1

19.1 Parts of 1,3-phenylenediamine-4-sulfonic acid (98.6%) are dissolved in 100 parts of water and 52 parts of an aqueous, 2 normal sodium hydroxide solution at a pH of 7, and the mixture is added dropwise to a mixture comprising 18.5 parts of cyanuric chloride, 100 parts of ice and 50 parts of water at a temperature of 5° C. in the course of 50 minutes. During this dropwise addition, the pH is kept at a value of 3 to 3.5. The pH is then increased to 7 in the course of 70 minutes with 50 parts of an aqueous, 2 normal sodium hydroxide solution. After one hour, 25 parts of hydrochloric acid (37%) and 200 parts of water are added, and 25 parts of an aqueous, 4 molar sodium nitrite solution are metered in at a temperature of 5 to 15° C. in the course of 25 minutes. After two hours, the excess sodium nitrite is destroyed with sulfamic acid. During this procedure, 22.5 parts of 2-naphthylamine-5-sulfonic acid are dissolved in 100 parts of water and 52 parts of an aqueous, 2 normal sodium hydroxide solution at a pH of 7 and the solution is added dropwise to the reaction mixture in the course of 30 minutes. Thereafter, the pH is brought to a value of 7 in the course of 80 minutes by means of 112 parts of an aqueous, 2 normal sodium hydroxide solution. A solution of 12.2 parts of N-ethylaniline in 100 parts of 1 molar hydrochloric acid is then added dropwise in the course of 15 minutes, followed by the addition of 101 parts of an aqueous, 2 normal sodium hydroxide solution in the course of 50 minutes. 500 parts of an aqueous sodium chloride solution are added to the dark red reaction solution and the product which has precipitated out is filtered off, washed with 10% strength aqueous sodium chloride solution and dried in vacuo at a temperature of 70° C. 52.5 parts of an intermediate compound of the formula

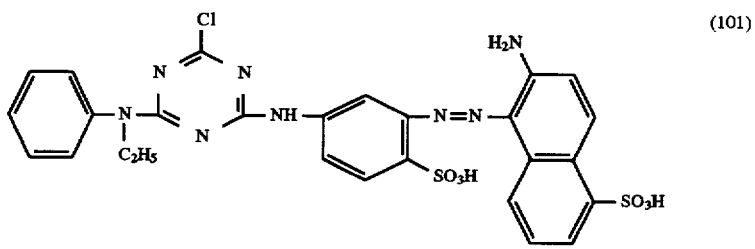

are obtained.

10 parts of the intermediate product of the formula (101) are dissolved in 200 parts of water and the solution is added dropwise to a solution of 14 parts of 3-methylaminopropylamine in 14 parts of water at a temperature of 40° C. in the course of 4 hours. The mixture is subsequently stirred at a temperature of 40° C. for one hour and 25 parts of hydrochloric acid are then added. The product which has precipitated out is filtered off and washed with water. The moist material on the suction filter is introduced into 300 parts of water at a temperature of 70° C. and neutralized with 10 parts of an aqueous, 1 normal sodium hydroxide solution. The product is salted out with 30 parts of sodium chloride, filtered off at a temperature of 40° C. and dried in vacuo at a temperature of 50° C. 8.8 parts of a dyestuff which, in the form of the free acid, is the compound of the formula

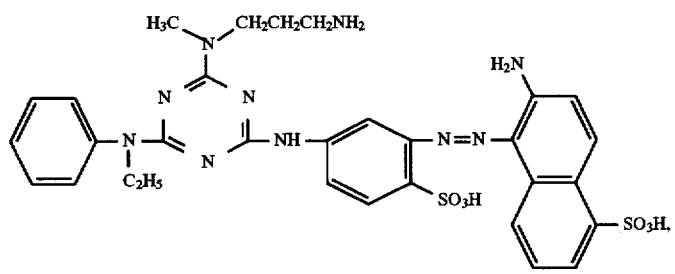

are obtained. The resulting dye of the formula (102) dyes wool and synthetic polyamide fibre material in orange colour shades.

PREPARATION EXAMPLE 2 to 25

The dyes shown in the form of the free acids in the following Table 1, which dye wool and synthetic polyamide fibre material in the colour shades shown in column 3, can be obtained in a manner analogous to the instructions in Preparation Example 1.

TABLE 1

| Preparation example | Dye | Colour shade on wool and polyamide |
|---|---|---|
| 2 | (103) | yellow |
| 3 | (104) | yellow |
| 4 | (105) | yellow |

TABLE 1-continued

| Preparation example | Dye | Colour shade on wool and polyamide |
|---|---|---|
| 5 | (106) | yellow |
| 6 | (107) | yellow |
| 7 | (108) | yellow |
| 8 | (109) | orange |

TABLE 1-continued
| Preparation example | Dye | Colour shade on wool and polyamide |
|---|---|---|
| 9 | 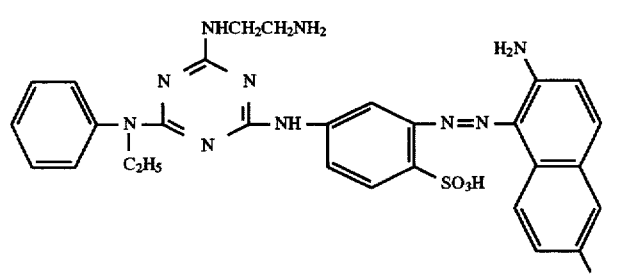 (110) | orange |
| 10 | 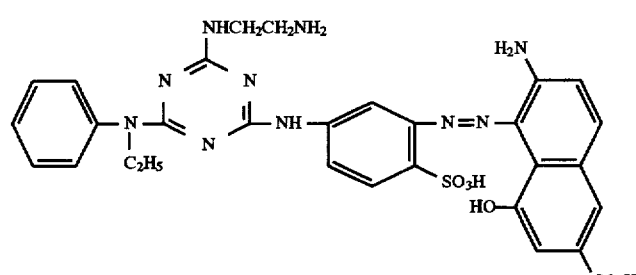 (111) | red |
| 11 | 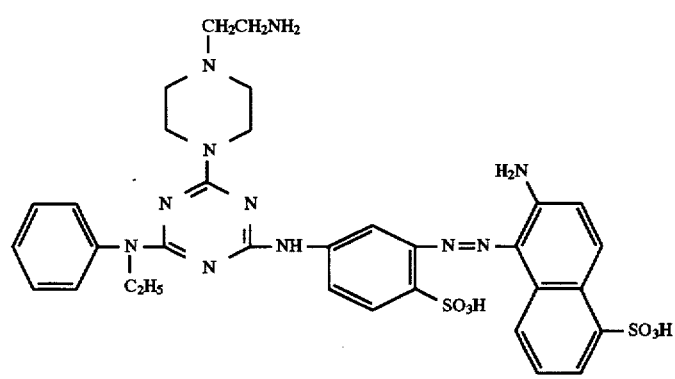 (112) | orange |
| 12 | 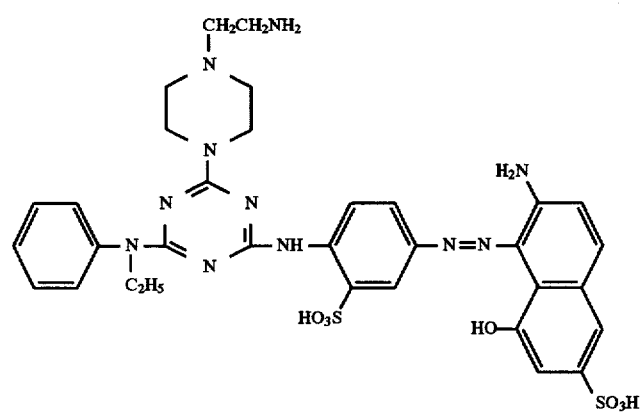 (113) | red |

TABLE 1-continued
| Preparation example | Dye | Colour shade on wool and polyamide |
|---|---|---|
| 13 | 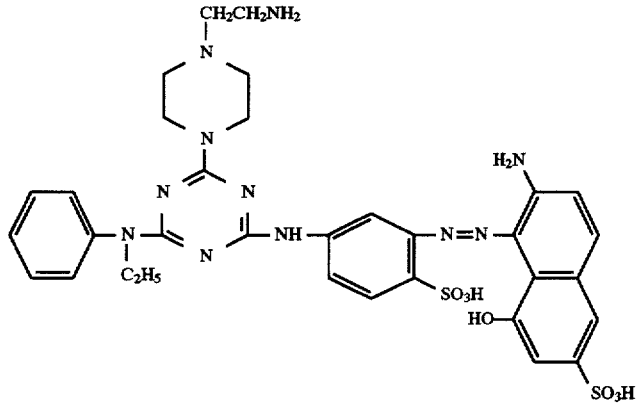 (114) | red |
| 14 | 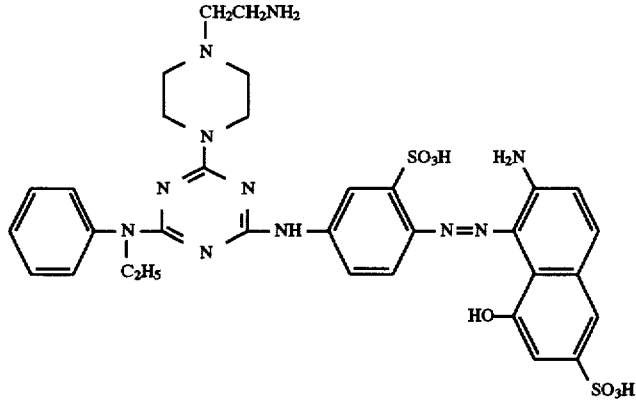 (115) | red |
| 15 | 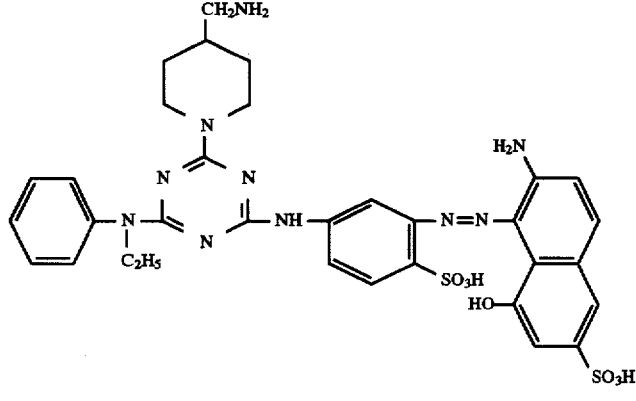 (116) | red |
| 16 | 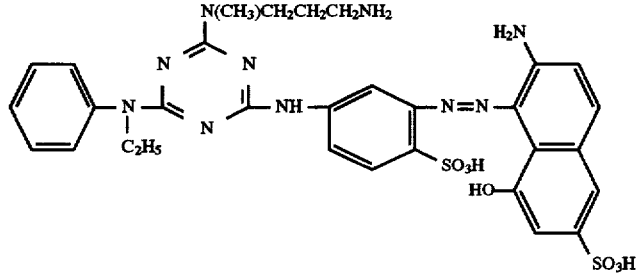 (117) | red |

TABLE 1-continued
| Preparation example | Dye | Colour shade on wool and polyamide |
|---|---|---|
| 17 | 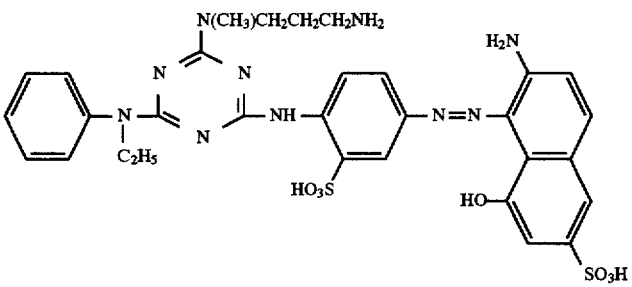 (118) | red |
| 18 | 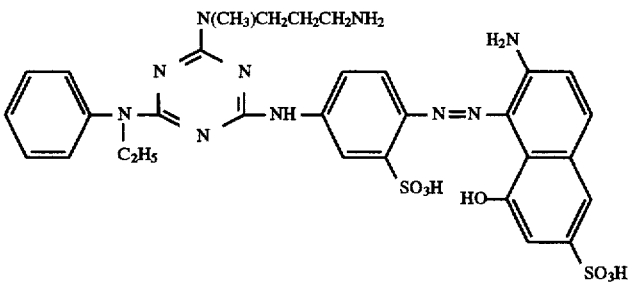 (119) | red |
| 19 | 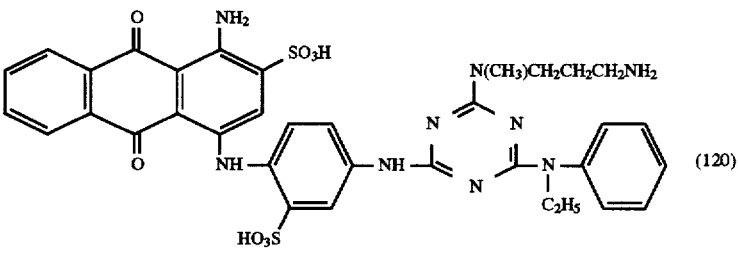 (120) | blue |
| 20 | 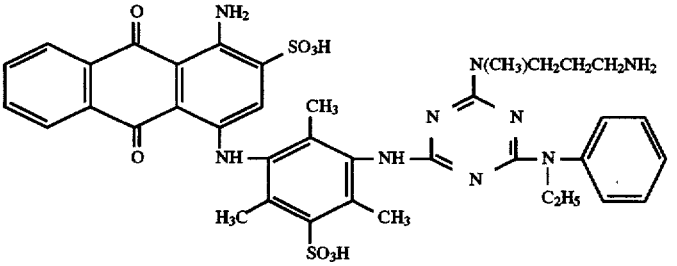 (121) | blue |
| 21 | 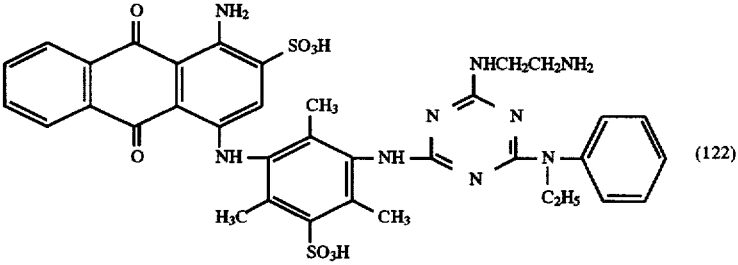 (122) | blue |

TABLE 1-continued
| Preparation example | Dye | Colour shade on wool and polyamide |
|---|---|---|
| 22 | 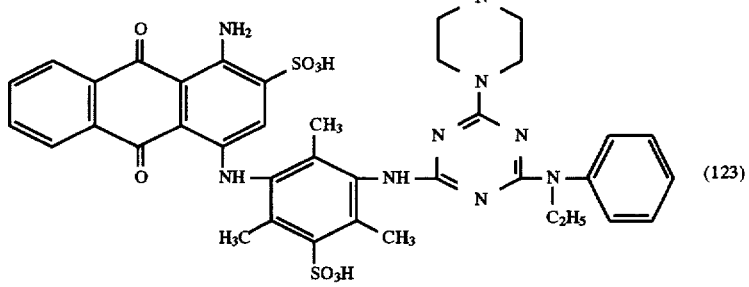 (123) | blue |
| 23 | 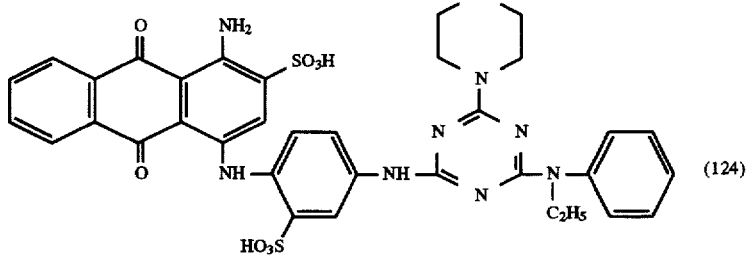 (124) | blue |
| 24 | 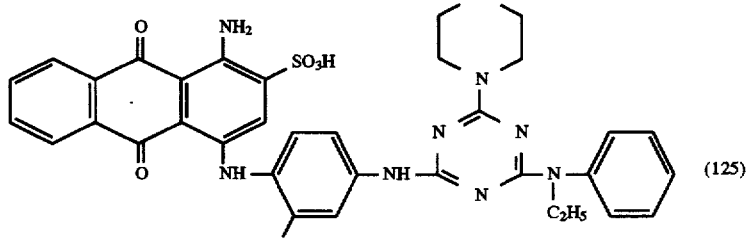 (125) | blue |
| 25 | 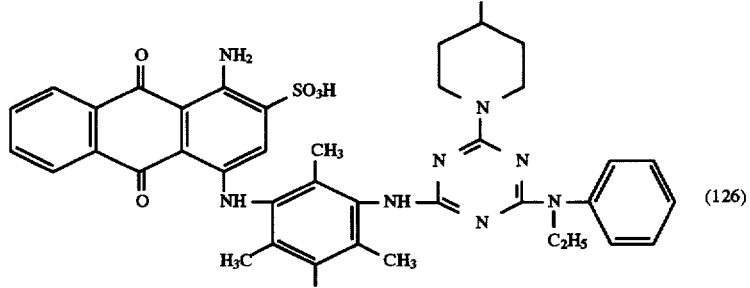 (126) | blue |

PREPARATION EXAMPLE 26

6.5 Parts of the dye of the formula

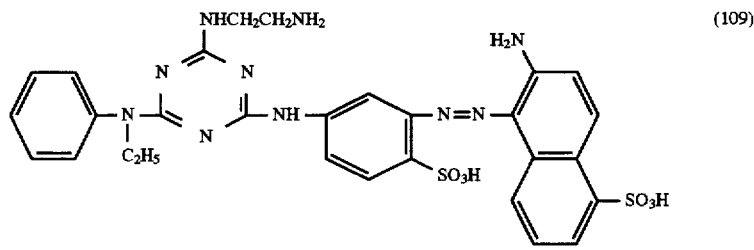
(109)

are dissolved in 100 parts of water and 10 parts of dioxane at a temperature of 35° to 40° C. and a pH of 6, the pH being established by means of hydrochloric acid (37%). 6 Parts of acetic anhydride are added dropwise in the course of 30 minutes, the pH being kept at a value between 5 and 6 by means of 1 molar aqueous sodium carbonate solution. The reaction solution is evaporated and the residue is dried in vacuo at a temperature of 70° C. A dye which, in the form of the free acid, is the compound of the formula

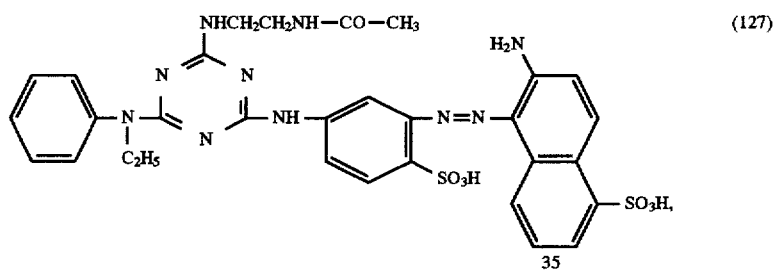
(127)

is obtained. The dye of the formula (127) dyes wool and synthetic polyamide fibre material in orange colour shades.

PREPARATION EXAMPLES 27 to 50

The dyes shown in the form of the free acids in the following Table 2, which dye wool and synthetic polyamide fibre material in the colour shades shown in column 3, can be obtained in an analogous manner to the instructions in Preparation Example 26.

TABLE 2

| Preparation example | Dye | Colour shade on wool and polyamide |
|---|---|---|
| 27 | (128) | yellow |

TABLE 2-continued

| Preparation example | Dye | Colour shade on wool and polyamide |
|---|---|---|
| 28 | (129) | yellow |
| 29 | (130) | yellow |
| 30 | (131) | yellow |
| 31 | (132) | yellow |

TABLE 2-continued
| Preparation example | Dye | Colour shade on wool and polyamide |
|---|---|---|
| 32 | 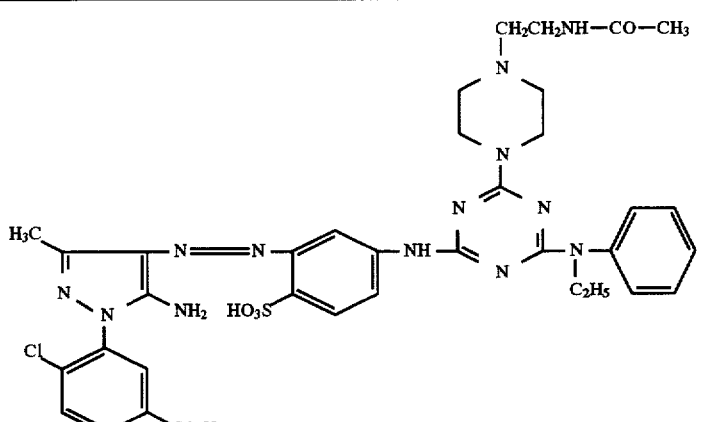 (133) | yellow |
| 33 | 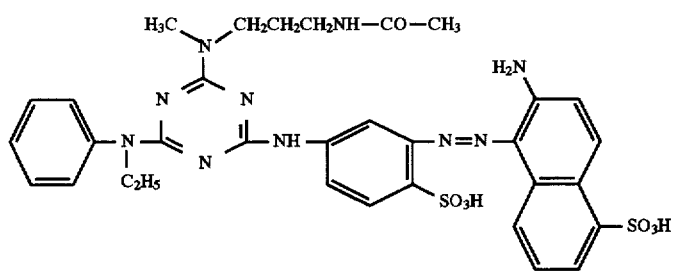 (134) | orange |
| 34 | 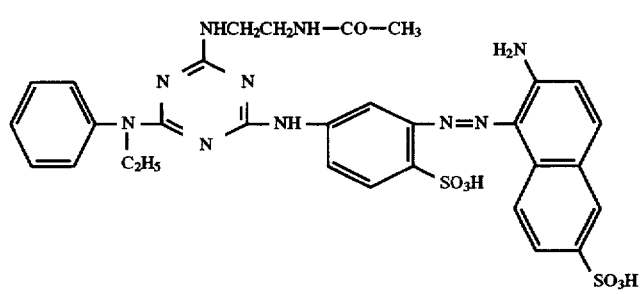 (135) | orange |
| 35 | 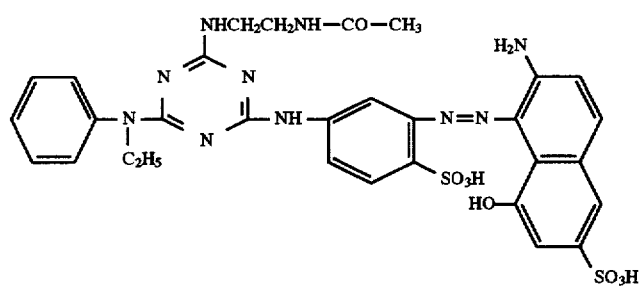 (136) | red |

TABLE 2-continued
| Preparation example | Dye | | Colour shade on wool and polyamide |
|---|---|---|---|
| 36 | 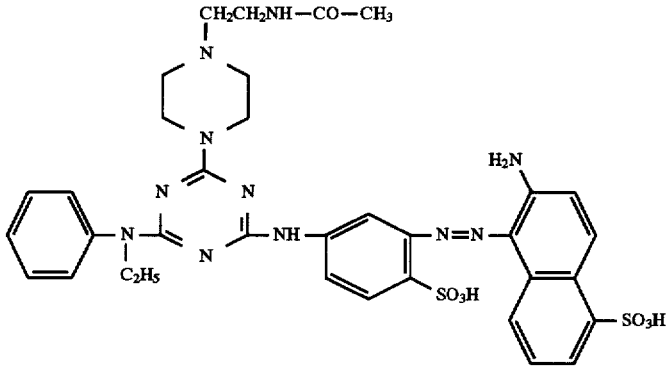 | (137) | orange |
| 37 | 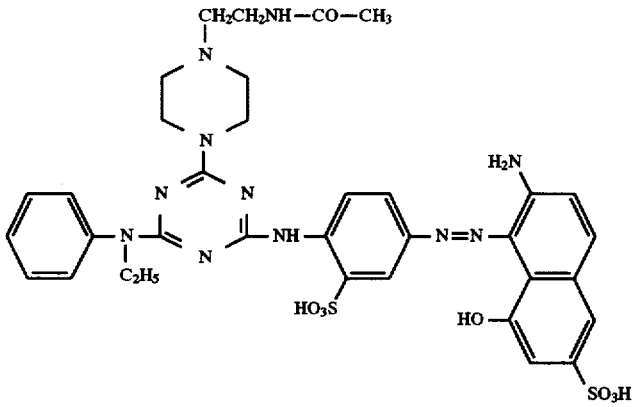 | (138) | red |
| 38 | 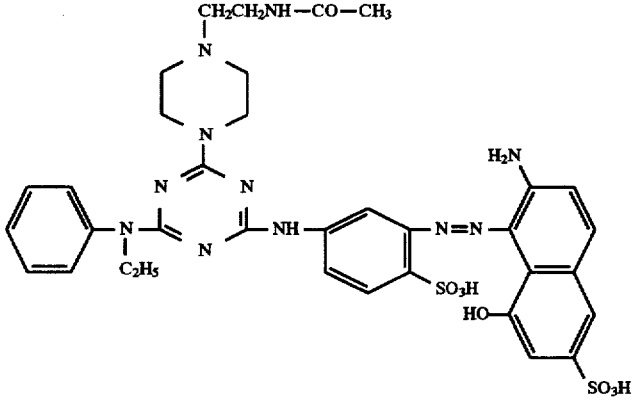 | (139) | red |

TABLE 2-continued

| Preparation example | Dye | Colour shade on wool and polyamide |
|---|---|---|
| 39 | (140) | red |
| 40 | (141) | red |
| 41 | (142) | red |
| 42 | (143) | red |

TABLE 2-continued
| Preparation example | Dye | Colour shade on wool and polyamide |
|---|---|---|
| 43 | 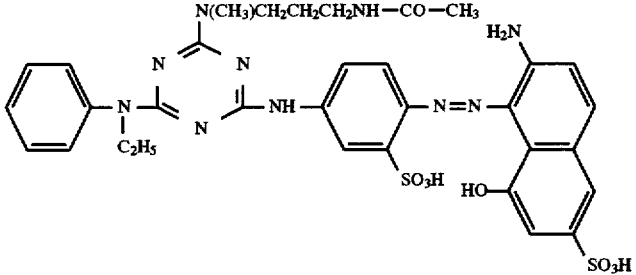 (144) | red |
| 44 | 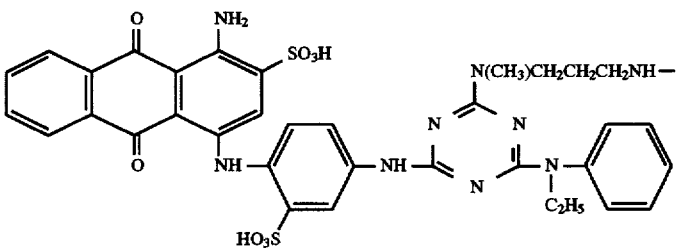 (145) | blue |
| 45 | 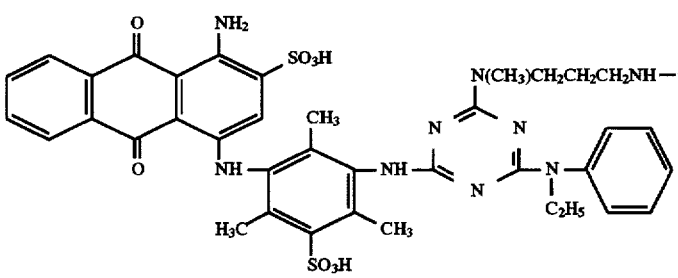 (146) | blue |
| 46 | 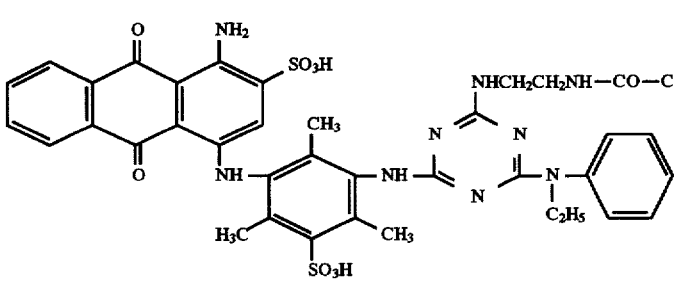 (147) | blue |
| 47 | 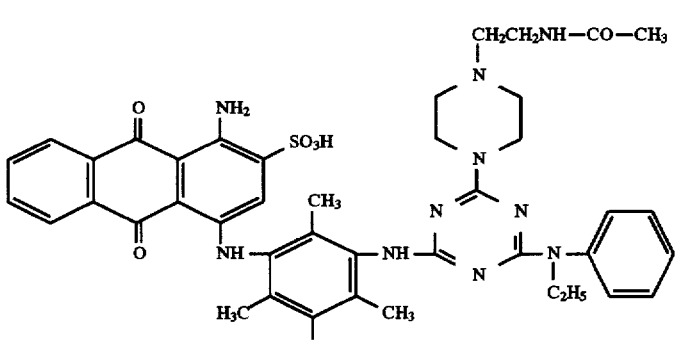 (148) | blue |

TABLE 2-continued

| Preparation example | Dye | Colour shade on wool and polyamide |
|---|---|---|
| 48 | (149) | blue |
| 49 | (150) | blue |
| 50 | (151) | blue |

PREPARATION EXAMPLE 51

7.5 Parts of the compound of the formula

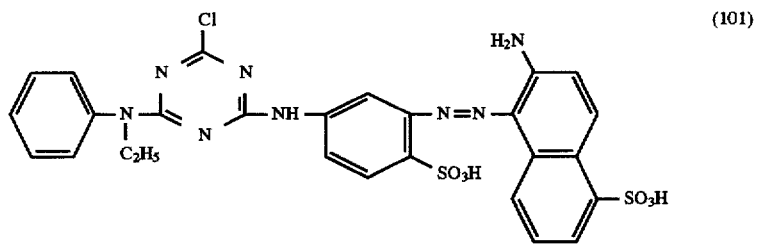

(101)

are dissolved in 150 parts of water, and 0.58 part of diaminohexane is added. The mixture is heated to a temperature of 75° C. and stirred at a pH of 9 for 12 hours. After the water has been evaporated off on a rotary evaporator, the moist product is dried in vacuo at a temperature of 70° C. 7.6 parts of a dye which, in the form of the free acid, is the compound of the formula

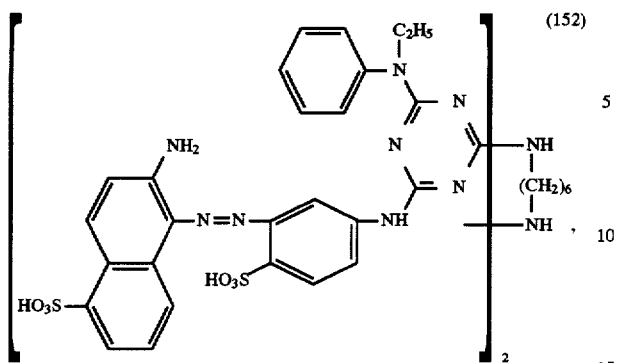

(152)

are obtained. The dye of the formula (152) dyes wool and synthetic polyamide fibre material in orange colour shades.

PREPARATION EXAMPLE 52 to 81

The dyes shown in the form of the free acids in the following Table 3, of the formula

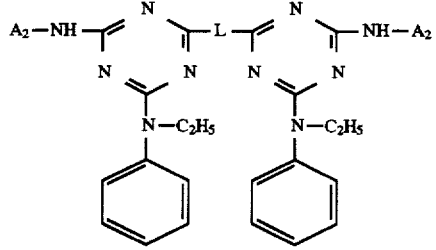

in which $A_2$ and L are as defined in Table 3, can be obtained in an analogous manner to the instructions in Preparation Example 51. The dyes shown in Table 3 dye wool and synthetic polyamide fibre material in the colour shades shown in column 4.

TABLE 3

| Preparation example | $A_2$ | L | Colour shade on wool and polyamide |
|---|---|---|---|
| 52 | (pyrazole with 3-sulfophenyl, NH₂, azo to 2-sulfophenyl) | $-N(CH_3)CH_2CH_2CH_2NH-$ | yellow |
| 53 | (pyrazole with 2,5-dichloro-4-sulfophenyl, OH, azo to 2-sulfophenyl) | $-N(CH_3)CH_2CH_2CH_2NH-$ | yellow |
| 54 | (pyrazole with 2-chloro-5-sulfophenyl, NH₂, azo to 2-sulfophenyl) | $-N(CH_3)CH_2CH_2CH_2NH-$ | yellow |
| 55 | (pyrazole with 2,5-dichloro-4-sulfophenyl, OH, azo to 2-sulfophenyl) | $-NHCH_2CH_2NH-$ | yellow |

TABLE 3-continued

| Preparation example | A₂ | L | Colour shade on wool and polyamide |
|---|---|---|---|
| 56 | 3-methyl-5-amino-1-(3-sulfophenyl)pyrazole coupled via azo to benzene bearing SO₃H | —NHCH₂CH₂NH— | yellow |
| 57 | 3-methyl-5-amino-1-(4-chloro-3-sulfophenyl)pyrazole coupled via azo to benzene bearing SO₃H | —N(piperazine)N—CH₂CH₂—NH— | yellow |
| 58 | 2-amino-1-(phenylazo)naphthalene with SO₃H on phenyl and 5-SO₃H on naphthalene | —NHCH₂CH₂NH— | orange |
| 59 | 2-amino-1-(phenylazo)naphthalene with SO₃H on phenyl and 6-SO₃H on naphthalene | —NHCH₂CH₂NH— | orange |
| 60 | 7-amino-8-(phenylazo)-1-hydroxy-naphthalene-3-sulfonic acid, phenyl bearing SO₃H | —NHCH₂CH₂NH— | red |
| 61 | 2-amino-1-(phenylazo)naphthalene with SO₃H on phenyl and 5-SO₃H on naphthalene | —N(piperazine)N—CH₂CH₂—NH— | orange |

TABLE 3-continued

| Preparation example | A₂ | L | Colour shade on wool and polyamide |
|---|---|---|---|
| 62 | 4-methyl-3-sulfophenyl-N=N- attached to 1-amino-8-hydroxy-naphthalene-2-amino-6-sulfo (H₂N at 2, HO at 8, SO₃H at 6) | -N(piperazine)N-CH₂CH₂-NH- | red |
| 63 | 4-methyl-2-sulfophenyl-N=N- attached to 1-amino-8-hydroxy-naphthalene (H₂N, HO, SO₃H) | -N(piperazine)N-CH₂CH₂-NH- | red |
| 64 | 4-methyl-2-sulfophenyl (SO₃H shown top) -N=N- attached to naphthalene (H₂N, HO, SO₃H) | -N(piperazine)N-CH₂CH₂-NH- | red |
| 65 | 4-methyl-2-sulfophenyl-N=N- attached to naphthalene (H₂N, HO, SO₃H) | -N(piperidine)-CH₂-NH- | red |
| 66 | 4-methyl-2-sulfophenyl-N=N- attached to naphthalene (H₂N, HO, SO₃H) | -N(CH₃)CH₂CH₂CH₂NH- | red |
| 67 | 4-methyl-3-sulfophenyl-N=N- attached to naphthalene (H₂N, HO, SO₃H) | -N(CH₃)CH₂CH₂CH₂NH- | red |

TABLE 3-continued

| Preparation example | A₂ | L | Colour shade on wool and polyamide |
|---|---|---|---|
| 68 | [structure: 2-methylphenyl-SO₃H azo-linked to 8-amino-1-hydroxy-naphthalene-... with NH₂, HO, SO₃H substituents] | —N(CH₃)CH₂CH₂CH₂NH— | red |
| 69 | [structure: 1-amino-2-sulfo-4-(2-sulfo-4-methylphenylamino)anthraquinone] | —N(CH₃)CH₂CH₂CH₂NH— | blue |
| 70 | [structure: 1-amino-2-sulfo-4-(2,4,6-trimethyl-3-sulfophenylamino)anthraquinone] | —N(CH₃)CH₂CH₂CH₂NH— | blue |
| 71 | [structure: 1-amino-2-sulfo-4-(2,4,6-trimethyl-3-sulfophenylamino)anthraquinone] | —NHCH₂CH₂NH— | blue |
| 72 | [structure: 1-amino-2-sulfo-4-(2,4,6-trimethyl-3-sulfophenylamino)anthraquinone] | —N(piperazine)N—CH₂CH₂—NH— | blue |

TABLE 3-continued

| Preparation example | A₂ | L | Colour shade on wool and polyamide |
|---|---|---|---|
| 73 | 1-amino-4-(4-methyl-2-sulfophenylamino)anthraquinone-2-sulfonic acid | −N(CH₂CH₂)₂N−CH₂CH₂−NH− (piperazine linker) | blue |
| 74 | 1-amino-4-(4-methyl-2-sulfophenylamino)anthraquinone-2-sulfonic acid | −N(piperidine-4-yl)−CH₂−NH− | blue |
| 75 | 1-amino-4-(2,4,6-trimethyl-3-sulfophenylamino)anthraquinone-2-sulfonic acid | −N(piperidine-4-yl)−CH₂−NH− | blue |
| 76 | 3-amino-4-[(4-methyl-2-sulfophenyl)azo]naphthalene-5-sulfonic acid | −N(CH₃)CH₂CH₂CH₂NH− | orange |
| 77 | 2-amino-1-[(4-methyl-2-sulfophenyl)azo]naphthalene-5-sulfonic acid | −NH−(CH₂)₁₂−NH− | orange |
| 78 | 2-amino-1-[(4-methyl-2-sulfophenyl)azo]naphthalene-5-sulfonic acid | −NH−(CH₂)₂−O−(CH₂)₂−O−(CH₂)₂−NH− | orange |

TABLE 3-continued

| Preparation example | A₂ | L | Colour shade on wool and polyamide |
|---|---|---|---|
| 79 | 2-amino-naphthalene-5-sulfonic acid azo-coupled with benzene-SO₃H (NH₂ on naphthalene, HO₃S on naphthalene and benzene) | —N(piperazine)N— | orange |
| 80 | same naphthylazo benzene structure as 79 | —NH—(cyclohexyl)—NH— | orange |
| 81 | pyrazolone derivative (H₃C, N-N, OH, N=N to benzene-SO₃H; N-phenyl with 2,5-dichloro-4-SO₃H) | —NH—CH(CH₃)—CH₂—NH— | yellow |

Example 1

6.5 Parts of the compound of the formula

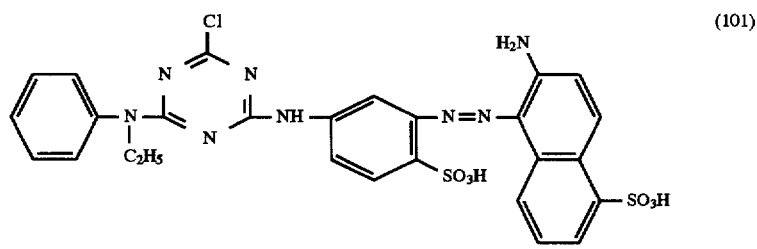

(101)

are initially introduced into 100 parts of water at room temperature, and 10 parts of an aqueous, 1 normal sodium hydroxide solution and 1.2 parts of 1,2-diaminoethane are added. The mixture is heated to a temperature of 55° to 60° C. and stirred at this temperature for 3 hours. The reaction solution is evaporated and the residue is dried in vacuo at a temperature of 70° C. A dye mixture which comprises the dyes of the formulae

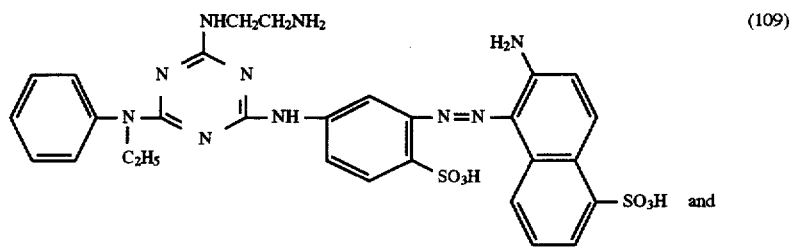
(109)

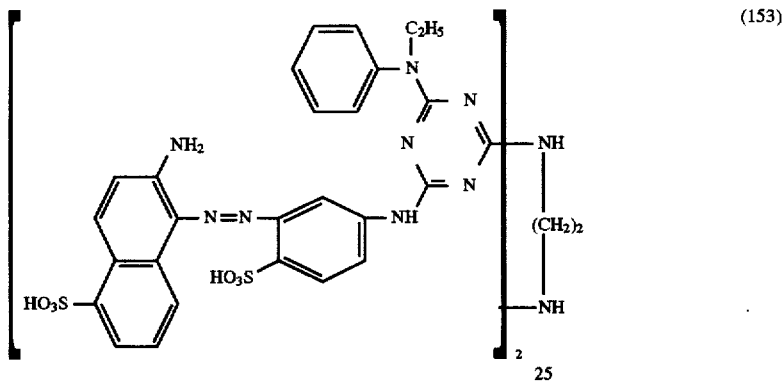
(153)

in a ratio of about 1:1 is obtained. The dye mixture of the dyes of the formulae (109) and (153) dyes wool and synthetic polyamide fibre material in orange colour shades.

Examples 2 to 25

The dye mixtures shown in the following Table 4, which dye wool and synthetic polyamide fibre material in the colour shades shown in column 3, can be obtained in an analogous manner to the instructions in Example 1.

TABLE 4

| Ex. | Dye mixture | Colour shade on wool and polyamide |
|---|---|---|
| 2 | Dye according to Preparation Example 2 and dye according to Preparation Example 52 | yellow |
| 3 | Dye according to Preparation Example 3 and dye according to Preparation Example 53 | yellow |
| 4 | Dye according to Preparation Example 4 and dye according to Preparation Example 54 | yellow |
| 5 | Dye according to Preparation Example 5 and dye according to Preparation Example 55 | yellow |
| 6 | Dye according to Preparation Example 6 and dye according to Preparation Example 56 | yellow |
| 7 | Dye according to Preparation Example 7 and dye according to Preparation Example 57 | yellow |
| 8 | Dye according to Preparation Example 9 and dye according to Preparation Example 59 | orange |
| 9 | Dye according to Preparation Example 10 and dye according to Preparation Example 60 | red |
| 10 | Dye according to Preparation Example 11 and dye according to Preparation Example 61 | orange |
| 11 | Dye according to Preparation Example 12 and dye according to Preparation Example 62 | red |
| 12 | Dye according to Preparation Example 13 and dye according to Preparation Example 63 | red |
| 13 | Dye according to Preparation Example 14 and dye according to Preparation Example 64 | red |
| 14 | Dye according to Preparation Example 15 and dye according to Preparation Example 65 | red |
| 15 | Dye according to Preparation Example 16 and dye according to Preparation Example 66 | red |
| 16 | Dye according to Preparation Example 17 and dye according to Preparation Example 67 | red |
| 17 | Dye according to Preparation Example 18 and dye according to Preparation Example 68 | red |

TABLE 4-continued

| Ex. | Dye mixture | Colour shade on wool and polyamide |
|---|---|---|
| 18 | Dye according to Preparation Example 19 and dye according to Preparation Example 69 | blue |
| 19 | Dye according to Preparation Example 20 and dye according to Preparation Example 70 | blue |
| 20 | Dye according to Preparation Example 21 and dye according to Preparation Example 71 | blue |
| 21 | Dye according to Preparation Example 22 and dye according to Preparation Example 72 | blue |
| 22 | Dye according to Preparation Example 23 and dye according to Preparation Example 73 | blue |
| 23 | Dye according to Preparation Example 24 and dye according to Preparation Example 74 | blue |
| 24 | Dye according to Preparation Example 25 and dye according to Preparation Example 75 | blue |
| 25 | Dye according to Preparation Example 1 and dye according to Preparation Example 76 | orange |

The dye mixtures shown in Examples 1 to 25 can also be obtained by mixing the individual components in a desired mixing ratio, for example a mixing ratio of 1:1.

Example 26

6.5 Parts of the compound of the formula

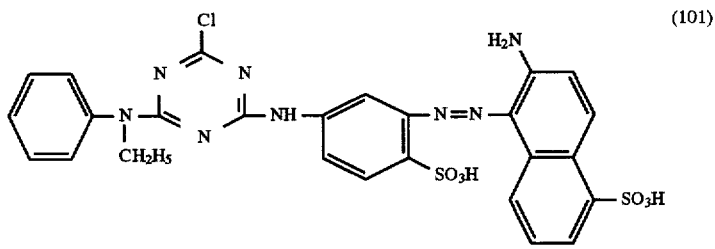

(101)

are initially introduced into 100 parts of water at room temperature, and 10 parts of an aqueous, 1 normal sodium hydroxide solution and 1.2 parts of 1,2-diaminoethane are added. The mixture is heated to a temperature of 55° to 60° C. and stirred at this temperature for 3 hours. The reaction solution is brought to a pH of 6 by means of hydrochloric acid (37%) at a temperature of 35° to 40° C., and 10 parts of dioxane are added. 6 Parts of acetic anhydride are then added dropwise in the course of 30 minutes, the pH being kept between 5 and 6 by means of 54 parts of an aqueous, 1 molar sodium carbonate solution. The reaction solution is evaporated and the residue is dried in vacuo at a temperature of 70° C. A dye mixture which comprises the dyes of the formulae

TABLE 5

| Ex. | Dye mixture | Colour shade on wool and polyamide |
|---|---|---|
| 27 | Dye according to Preparation Example 27 and dye according to Preparation Example 52 | yellow |
| 28 | Dye according to Preparation Example 28 and dye according to Preparation Example 53 | yellow |
| 29 | Dye according to Preparation Example 29 and dye according to Preparation Example 54 | yellow |
| 30 | Dye according to Preparation Example 30 and dye according to Preparation Example 55 | yellow |
| 31 | Dye according to Preparation Example 31 and dye according to Preparation Example 56 | yellow |
| 32 | Dye according to Preparation Example 32 and dye according to Preparation Example 57 | yellow |
| 33 | Dye according to Preparation Example 34 and dye according to Preparation Example 59 | orange |
| 34 | Dye according to Preparation Example 35 and dye according to Preparation Example 60 | red |
| 35 | Dye according to Preparation Example 36 and dye according to Preparation Example 61 | orange |
| 36 | Dye according to Preparation Example 37 and dye according to Preparation Example 62 | red |

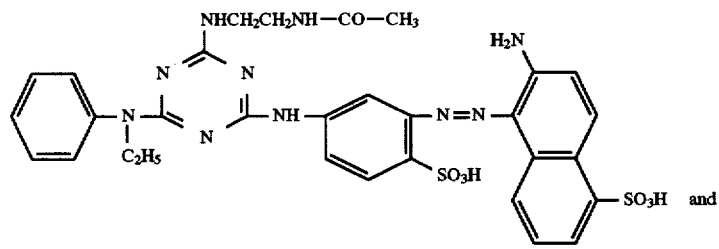

(127)

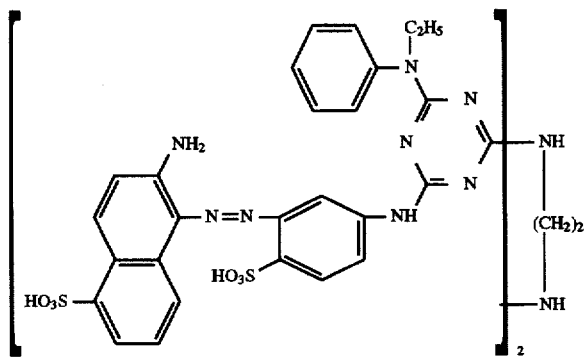

(153)

in a ratio of about 1:1 is obtained. The dye mixture of the dyes of the formulae (127) and (153) dyes wool and synthetic polyamide fibre material in orange colour shades.

Examples 27 to 50

The dye mixtures shown in the following Table 5, which dye wool and synthetic polyamide fibre material in the colour shades shown in column 3, can be obtained in an analogous manner to the instructions in Example 26.

TABLE 5-continued

| Ex. | Dye mixture | Colour shade on wool and polyamide |
|---|---|---|
| 37 | Dye according to Preparation Example 38 and dye according to Preparation Example 63 | red |
| 38 | Dye according to Preparation Example 39 and dye according to Preparation Example 64 | red |
| 39 | Dye according to Preparation Example 40 and dye according to Preparation Example 65 | red |
| 40 | Dye according to Preparation Example 41 and dye according to Preparation Example 66 | red |
| 41 | Dye according to Preparation Example 42 and dye according to Preparation Example 67 | red |
| 42 | Dye according to Preparation Example 43 and dye according to Preparation Example 68 | red |
| 43 | Dye according to Preparation Example 44 and dye according to Preparation Example 69 | blue |
| 44 | Dye according to Preparation Example 45 and dye according to Preparation Example 70 | blue |
| 45 | Dye according to Preparation Example 46 and dye according to Preparation Example 71 | blue |
| 46 | Dye according to Preparation Example 47 and dye according to Preparation Example 72 | blue |
| 47 | Dye according to Preparation Example 48 and dye according to Preparation Example 73 | blue |
| 48 | Dye according to Preparation Example 49 and dye according to Preparation Example 74 | blue |
| 49 | Dye according to Preparation Example 50 and dye according to Preparation Example 75 | blue |
| 50 | Dye according to Preparation Example 33 and dye according to Preparation Example 76 | orange |

The dye mixtures shown in Examples 26 to 50 can likewise be obtained by mixing the individual components in a desired mixing ratio, for example a mixing ratio of 1:1.

If the dye according to Preparation Example 1 is mixed with the dyes according to Preparation Examples 51 to 81 in a mixing ratio of 1:1, dye mixtures which dye wool and synthetic polyamide fibre material are likewise obtained.

Dyeing example

100 Parts of a woollen fabric are pretreated for 5 minutes at a temperature of 30° C. and a pH of 4.5 in an aqueous bath which comprises 2000 parts of water, 5 parts of sodium sulfate, 2 parts of sodium acetate and 2 parts of 80% acetic acid. After addition of an aqueous solution comprising 0.9 part of the dye mixture according to Example 1, the dye liquor is kept at a temperature of 30° C. for a further 5 minutes and then heated to a temperature of 100° C. at a heating up rate of 1.5° C. per minute. Dyeing is carried out at this temperature for 60 minutes, the bath is then cooled to 50° C. and the dye liquor is drained off. The woollen fabric, which is dyed in an orange colour shade, is rinsed and dried in the customary manner.

What is claimed is:

1. A dye mixture which comprises at least one dye of the formula

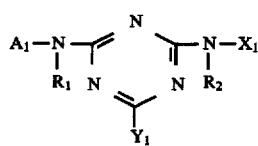
(1)

and at least one dye of the formula

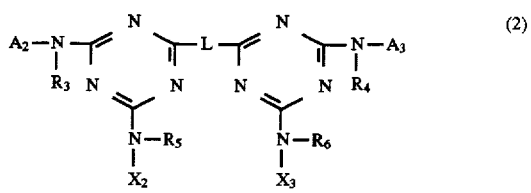
(2)

in which

R$_1$, R$_2$, R$_3$, R$_4$, R$_5$ and R$_6$ independently of one another are hydrogen or substituted or unsubstituted C$_1$-C$_4$alkyl, X$_1$, X$_2$ and X$_3$ independently of one another are substituted or unsubstituted C$_1$-C$_8$alkyl, C$_5$-C$_7$cycloalkyl, phenyl or naphthyl which are unsubstituted or substituted by C$_1$-C$_4$alkyl, C$_1$-C$_4$alkoxy, C$_2$-C$_4$alkanoylamino, amino, hydroxyl, ureido, halogen, carboxyl or sulfo, or the radical of the formula —N(R$_2$)—X$_1$, —N(R$_5$)—X$_2$ or —N(R$_6$)—X$_3$ is a ring which may contain further heteroatoms, L is an organic bridge member, Y$_1$ is a radical of the formula

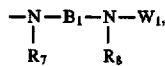
(3a)

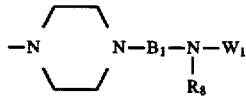
(3b)

or

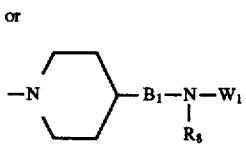
(3c)

in which

B$_1$ is a colourless organic bridge member,

R$_7$ and R$_8$ independently of one another are hydrogen or substituted or unsubstituted C$_1$-C$_4$alkyl, W$_1$ is hydrogen, substituted or unsubstituted C$_1$-C$_8$alkyl, C$_5$-C$_7$cycloalkyl, phenyl or naphthyl, or a radical of the formula —CO—R, in which R is substituted or unsubstituted C$_1$-C$_8$alkyl, C$_5$-C$_7$cycloalkyl, phenyl or naphthyl, and A$_1$, A$_2$ and A$_3$ independently of one another are radicals of a monoazo, polyazo, metal complex azo, anthraquinone, formazan, phthalocyanine or dioxazine dye.

2. A dye mixture according to claim 1, in which R$_1$, R$_2$, R$_3$, R$_4$, R$_5$ and R$_6$ independently of one another are hydrogen or C$_1$-C$_4$alkyl.

3. A dye mixture according to claim 1, in which X$_1$, X$_2$ and X$_3$ independently of one another are C$_1$-C$_8$alkyl, C$_5$-C$_7$cycloalkyl which is unsubstituted or substituted by C$_1$-C$_4$alkyl, or phenyl or naphthyl which are unsubstituted or substituted by C$_1$-C$_4$alkyl, C$_1$-C$_4$alkoxy, C$_2$-C$_4$alkanoylamino, ureido, halogen, carboxyl or sulfo.

4. A dye mixture according to claim 1, in which X$_1$, X$_2$ and X$_3$ independently of one another are phenyl which is unsubstituted or substituted by C$_1$-C$_4$alkyl, C$_1$-C$_4$alkoxy, C$_2$-C$_4$alkanoylamino, ureido, halogen, carboxyl or sulfo.

5. A dye mixture according to claim 1, in which

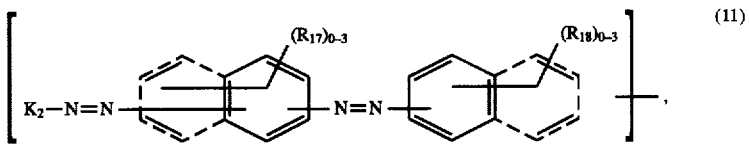

6. A dye mixture according to claim 1, in which
R is $C_1$–$C_8$alkyl or phenyl which is unsubstituted or substituted by $C_1$–$C_4$alkyl, $C_1$–$C_4$alkoxy, halogen, carboxyl or sulfo.

7. A dye mixture according to claim 1, in which
$W_1$ is hydrogen or a radical of the formula —CO—R in which R is $C_1$–$C_8$alkyl or phenyl which is unsubstituted or substituted by $C_1$–$C_4$alkyl, $C_1$–$C_4$alkoxy, halogen, carboxyl or sulfo.

8. A dye mixture according to claim 1, in which
L is a radical of the formula

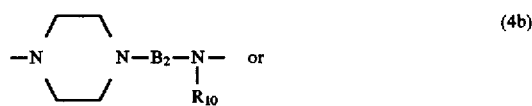

in which
$R_9$ and $R_{10}$ independently of one another are hydrogen or $C_1$–$C_4$alkyl and
$B_2$ is a $C_1$–$C_{10}$alkylene radical, which can be interrupted by 1, 2 or 3 members from the group consisting of —NH—, —N(CH$_3$)— and —O— and is unsubstituted or substituted by hydroxyl, sulfo, sulfato, cyano or carboxyl.

9. A dye mixture according to claim 1, in which
$A_1$, $A_2$ and $A_3$ independently of one another are radicals of a monoazo, disazo or anthraquinone dye.

10. A dye mixture according to claim 1, in which
$A_1$, $A_2$ and $A_3$ independently of one another are radicals of the formula

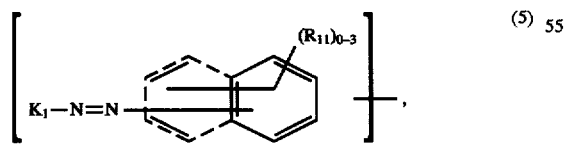

in which $(R_{11})_{0-3}$ is 0 to 3 identical or different substituents chosen from the group consisting of $C_1$–$C_4$alkyl, $C_1$–$C_4$alkoxy, $C_2$–$C_4$alkanoylamino, halogen, hydroxyl, cyano, carbamoyl, carboxyl, sulfo, amino and N-mono- or N,N-di-$C_1$–$C_4$alkylamino and
$K_1$ is a radical of the benzene or naphthalene series or a heterocyclic radical, or of the formula B$_1$ is a $C_1$–$C_{10}$alkylene radical, which can be interrupted by 1, 2 or 3 members from the group consisting of —NH—, —N(CH$_3$)— and —O— and is unsubstituted or substituted by hydroxyl, sulfo, sulfato, cyano or carboxyl.

in which
$(R_{17})_{0-3}$ and $(R_{18})_{0-3}$ independently of one another are 0 to 3 identical or different substituents chosen from the group consisting of $C_1$–$C_4$alkyl, $C_1$–$C_4$alkoxy, $C_2$–$C_4$alkanoylamino, halogen, hydroxyl, cyano, carbamoyl, carboxyl, sulfo, amino and N-mono- or N,N-di-$C_1$–$C_4$alkylamino, and
$K_2$ is a radical of the benzene or naphthalene series or a heterocyclic radical, or of the formula

in which G is a phenylene radical which is unsubstituted or substituted by $C_1$–$C_4$alkyl, $C_1$–$C_4$alkoxy, halogen, carboxyl or sulfo, or a cyclohexylene, phenylenemethylene or $C_2$–$C_6$alkylene radical.

11. A dye mixture according to claim 1, in which
$A_1$, $A_2$ and $A_3$ independently of one another are radicals of the formula

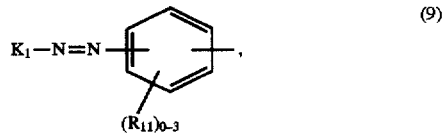

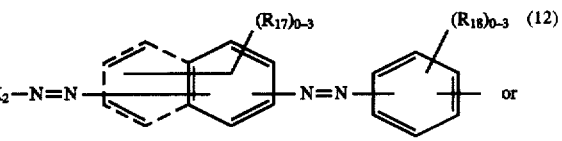

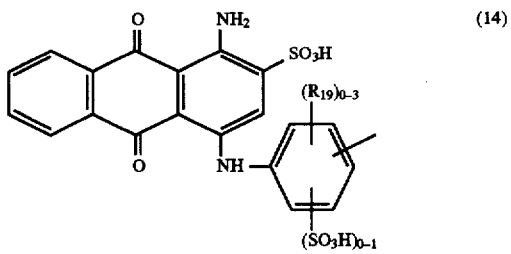

in which
$(R_{11})_{0-3}$ is 0 to 3 identical or different substituents chosen from the group consisting of $C_1$–$C_4$alkyl, $C_1$–$C_4$alkoxy, halogen and sulfo,
$(R_{17})_{0-3}$ and $(R_{18})_{0-3}$ independently of one another are 0 to 3 identical or different substituents chosen from the group consisting of $C_1$–$C_4$alkyl, $C_1$–$C_4$alkoxy, $C_2$–$C_4$alkanoylamino halogen, hydroxyl, cyano, carbamoyl, carboxyl, sulfo, amino and N-mono- or N,N-di-$C_1$–$C_4$alkylamino, $(R_{19})_{0-3}$ is 0 to 3 identical or different substituents chosen from the group consisting of $C_1$-$C_4$alkyl, $C_1$-$C_4$alkoxy, halogen, carboxyl and sulfo, and $K_1$ and $K_2$ independently of one another are a radical of the formula

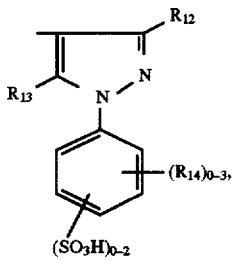

(6)

in which $R_{12}$ is methyl or carboxyl, $R_{13}$ is amino or hydroxyl and $(R_{14})_{0-3}$ is 0 to 3 identical or different substituents chosen from the group consisting of $C_1$-$C_4$alkyl, $C_1$-$C_4$alkoxy, $C_2$-$C_4$alkanoylamino, ureido, halogen, carboxyl and sulfo, or are a radical of the formula

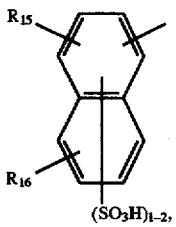

(7)

in which $R_{15}$ is hydrogen, amino or N-mono- or N,N-di-$C_1$-$C_4$alkylamino and $R_{16}$ is hydrogen or hydroxyl.

12. A dye mixture according to claim 1, in which $R_1$, $R_2$, $R_3$, $R_4$, $R_5$, $R_6$, $R_7$ and $R_8$ are hydrogen or $C_1$-$C_4$alkyl, $X_1$, $X_2$ and $X_3$ are phenyl which is unsubstituted or substituted by $C_1$-$C_4$alkyl, $C_1$-$C_4$alkoxy, $C_2$-$C_4$alkanoylamino, ureido, halogen, carboxyl or sulfo, $B_1$ is a $C_1$-$C_{10}$alkylene radical, which can be interrupted by 1, 2 or 3 members from the group consisting of —NH—, —N(CH$_3$)— and —O— and is unsubstituted or substituted by hydroxyl, sulfo, sulfato, cyano or carboxyl, $W_1$ is hydrogen or a radical of the formula —CO—R, in which R is $C_1$-$C_8$alkyl or phenyl which is unsubstituted or substituted by $C_1$-$C_4$alkyl, $C_1$-$C_4$alkoxy, halogen, carboxyl or sulfo, and L is a radical of the formula

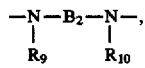

(4a)

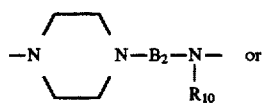

(4b)

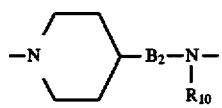

(4c)

in which $R_9$ and $R_{10}$ are hydrogen or $C_1$-$C_4$alkyl and $B_2$ is as defined above for $B_1$.

13. A dye mixture according to claim 1, in which $Y_1$ is a radical of the formula

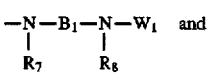

(3a)

L is a radical of the formula

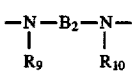

(4a)

or $Y_1$ is a radical of the formula

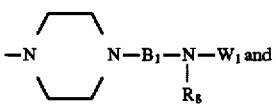

(3b)

L is a radical of the formula

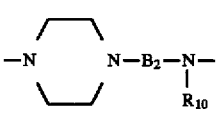

(4b)

or $Y_1$ is a radical of the formula

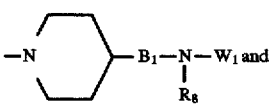

(3c)

L is a radical of the formula

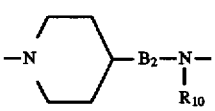

(4c)

in which $B_1$ and $B_2$ have identical meanings and are a $C_1$-$C_{10}$alkylene radical, which can be interrupted by 1, 2 or 3 members from the group consisting of —NH—, —N(CH$_3$)— and —O— and is unsubstituted or substituted by hydroxyl, sulfo, sulfato, cyano or carboxyl, $R_7$ and $R_9$ have identical meanings and are hydrogen or $C_1$-$C_4$alkyl, $R_8$ and $R_{10}$ have identical meanings and are hydrogen or $C_1$-$C_4$alkyl and $W_1$ is hydrogen or a radical of the formula —CO—R, in which R is $C_1$-$C_8$alkyl or phenyl which is unsubstituted or substituted by $C_1$-$C_4$alkyl, $C_1$-$C_4$alkoxy, halogen, carboxyl or sulfo.

14. A dye mixture according to claim 1, in which $R_2$, $R_5$ and $R_6$ are $C_1$-$C_4$alkyl.

15. A process for dyeing or printing hydroxyl group-containing or nitrogen group-containing fibre material, which process comprises applying to said fibre material a tinctorial amount of a dye mixture according to claim 1.

16. A process according to claim 15, wherein said fibre material is natural or synthetic polyamide fibre material.

* * * * *